(12) United States Patent
Hu et al.

(10) Patent No.: US 11,601,047 B2
(45) Date of Patent: Mar. 7, 2023

(54) ELECTRICAL CONTROL ASSEMBLY AND ELECTRICAL DEVICE

(71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Jian Hu, Foshan (CN); Junfeng Hou, Foshan (CN); Dingjun Liang, Foshan (CN); Wei Zhang, Foshan (CN)

(*) Notice: Subject to any disclaimer, the term of this patent is extended or adjusted under 35 U.S.C. 154(b) by 0 days.

(21) Appl. No.: 17/286,484

(22) PCT Filed: Dec. 21, 2018

(86) PCT No.: PCT/CN2018/122680
§ 371 (c)(1),
(2) Date: Apr. 18, 2021

(87) PCT Pub. No.: WO2020/077821
PCT Pub. Date: Apr. 23, 2020

(65) Prior Publication Data
US 2021/0391771 A1    Dec. 16, 2021

(30) Foreign Application Priority Data
Oct. 17, 2018    (CN) .......................... 201811213639.2

(51) Int. Cl.
*H02M 1/44* (2007.01)
*H02M 7/00* (2006.01)
*H02M 1/12* (2006.01)

(52) U.S. Cl.
CPC ............. *H02M 1/44* (2013.01); *H02M 1/126* (2013.01); *H02M 7/003* (2013.01)

(58) Field of Classification Search
CPC ......... H02M 1/126; H02M 1/44; H02M 7/003
See application file for complete search history.

(56) References Cited

U.S. PATENT DOCUMENTS

2018/0007785 A1*  1/2018  Kamikura ............. H02M 5/458
2018/0342973 A1*  11/2018  Li ........................... H02K 5/225

FOREIGN PATENT DOCUMENTS

CN         101617570 A      12/2009
CN         201438671 U       4/2010
(Continued)

OTHER PUBLICATIONS

European Search Report,European Application No. 18937280.8,dated Oct. 5, 2021 (7 pages).
(Continued)

*Primary Examiner* — Jue Zhang
(74) *Attorney, Agent, or Firm* — Kilpatrick Townsend & Stockton, LLP

(57) ABSTRACT

Disclosed are an electric control assembly and an electrical device. The electric control assembly includes an electric control board and a metal plate arranged on one side of the electric control board in parallel. The electric control board includes a first filter circuit and a power supply line. The power supply line includes a power input terminal, a rectifier circuit, an intelligent power module and a power output terminal. The power input terminal, the rectifier circuit, the intelligent power module and the power output terminal are connected in sequence. A first end of the first filter circuit is connected with the power supply line. The metal plate and the electric control board are arranged at an interval. The metal plate is electrically connected with a shell of the electrical load. A second end of the first filter circuit is electrically connected with the metal plate.

17 Claims, 6 Drawing Sheets

(56) References Cited

FOREIGN PATENT DOCUMENTS

| | | |
|---|---|---|
| CN | 102027661 A | 4/2011 |
| CN | 208797779 U | 4/2019 |
| JP | 5300775 B2 | 9/2013 |

OTHER PUBLICATIONS

International search report, International Application No. PCT/CN2018/122680 dated Jul. 3, 2019 (12 pages).

* cited by examiner

ELECTRICAL CONTROL ASSEMBLY AND ELECTRICAL DEVICE

CROSS-REFERENCES TO RELATED APPLICATIONS

The present disclosure is a national phase application of International Application No. PCT/CN2018/122680, filed on Dec. 21, 2018, which claims foreign priority of Chinese Patent Application No. 201811213639.2, filed on Oct. 17, 2018, the entireties of which are herein incorporated by reference.

FIELD

The present disclosure relates to the field of electronic circuits technology, and in particular, to an electronic control assembly and an electrical device.

BACKGROUND

Electro Magnetic Compatibility (EMC) refers to an ability of device or system to meet requirements of operation in an electromagnetic environment without producing unbearable electromagnetic interference to any equipment in an environment where the device or system is located. Therefore, EMC includes two requirements: on the one hand, it requires that electromagnetic interference generated by the device to an environment where the device is located in a normal operation process cannot exceed a limit; on the other hand, it requires that the device has a degree of immunity to the electromagnetic interference in the environment where the device is located, that is, electromagnetic sensitivity.

In prior art, EMC is generally improved by adding EMC filter components and optimizing parameters of the EMC filter components, such as adopting magnetic rings, X capacitors or common differential mode inductors according to different frequency bands, or adding magnetic ring suppression to output, etc. However, there are many disadvantages such as high cost of EMC, large number of magnetic rings, complex installation and low production efficiency. Moreover, a size of EMC suppression device is large. Because of limitation of an external size of the EMC suppression device and an internal structure of motor, improvement methods above can not be applied in miniaturization of electronic control scheme.

SUMMARY

An electronic control assembly is provided by the present disclosure. The electronic control assembly includes an electric control board and a metal plate arranged on one side of the electric control board in parallel. The electric control board includes a first filter circuit and a power supply line for supplying power to an electrical load. The power supply line includes a power input terminal, a rectifier circuit, an intelligent power module and a power output terminal. The power input terminal, the rectifier circuit, the intelligent power module and the power output terminal are successively connected. A first end of the first filter circuit is connected with the power supply line. The metal plate and the electric control board are arranged at intervals. The metal plate is electrically connected with a shell of the electrical load. A second end of the first filter circuit is electrically connected with the metal plate.

Alternatively, at least one of positions between the power input terminal and the rectifier circuit, between the rectifier circuit and the intelligent power module, and between the intelligent power module and the power output terminal is connected with one first filter circuit.

Alternatively, the number of the first filter circuits is two, and a power supply line between the power input terminal and the rectifier circuit. A power supply line between the rectifier circuit and the intelligent power module are respectively connected with first ends of two first filter circuits in one-to-one correspondence. Or, the power supply line between the power input terminal and the rectifier circuit, and a power supply line between the intelligent power module and the power output terminal are respectively connected with the first ends of the two first filter circuits in one-to-one correspondence. Or, the power supply line between the rectifier circuit and the intelligent power module, and the power supply line between the intelligent power module and the power output terminal are respectively connected with the first ends of the two first filter circuits in one-to-one correspondence.

Alternatively, the number of the first filter circuits is three, and first ends of three first filter circuits are respectively connected between the power input terminal and the rectifier circuit, between the rectifier circuit and the intelligent power module, and between the intelligent power module and the power output terminal in one-to-one correspondence.

Alternatively, the power input terminal includes a neutral wire and a live wire. In response to the first end of the first filter circuit being connected between the power input terminal and the rectifier circuit, the first filter circuit includes a neutral wire filter unit and a live wire filter unit, and one end of the neutral wire filter unit and one end of the live wire filter unit are respectively connected with the neutral wire and the live wire in one-to-one correspondence, and the other end of the neutral wire filter unit and the other end of the live wire filter unit are connected with the metal plate. In response to the first end of the first filter circuit being connected between the rectifier circuit and the intelligent power module, the first filter circuit comprises a positive filter unit and a negative filter unit, one end of the positive filter unit and one end of the negative filter unit are respectively connected with the positive output end and the negative output end of the rectifier circuit in one-to-one correspondence and the other end of the positive filter unit and the other end of the negative filter unit are connected with the metal plate. In response to the first end of the first filter circuit being connected between the intelligent power module and the power output terminal, the first filter circuit comprises a three-phase filter unit, three ends of the three-phase filter unit are respectively connected with a three-phase power source terminal of the power output terminal in one-to-one correspondence, and the other three ends of the three-phase filter unit are connected with the metal plate.

Alternatively, the metal plate is connected with a ground wire of an AC power supply.

Alternatively, the electronic control assembly further includes an insulating component, and the insulating component is clamped between the electric control board and the metal plate.

Alternatively, the first filter circuit includes a first capacitor, a first end of the first capacitor is the first end of the first filter circuit, and a second end of the first capacitor is connected with the metal plate.

Alternatively, the first filter circuit further includes a first resistor or a first inductor, and the first inductor or the first resistor is arranged in series between the second end of the first capacitor and the metal plate.

Alternatively, the first filter circuit further includes a first resistor and a first inductor, and the first inductor and the first resistor are respectively arranged in series between the second end of the first capacitor and the metal plate.

Alternatively, a second filter circuit is arranged in series between the metal plate and the shell of the electrical load.

Alternatively, the second filter circuit includes a first capacitor, a first end of the first capacitor is the first end of the second filter circuit, and a second end of the first capacitor is connected with the metal plate.

Alternatively, the second filter circuit further includes a first resistor or a first inductor, and the first inductor or the first resistor is arranged in series between the second end of the first capacitor and the metal plate.

Alternatively, the second filter circuit further includes a first resistor and a first inductor, and the first inductor and the first resistor are respectively arranged in series between the second end of the first capacitor and the metal plate.

An electrical device is further provided by the present disclosure. The electrical device includes the electronic control assembly as described above in the present disclosure. The electronic control assembly includes an electric control board a metal plate arranged on one side of the electric control board in parallel. The electric control board includes a power input terminal, a rectifier circuit, an intelligent power module, a power output terminal and a first filter circuit. The power input terminal, the rectifier circuit, the intelligent power module and the power output terminal are successively connected to form a power supply line for supplying power to an electrical load. A first end of the first filter circuit is connected with the power supply line. The metal plate and the electric control board are arranged at intervals. The metal plate is electrically connected with a shell of the electrical load. A second end of the first filter circuit is electrically connected with the metal plate.

Alternatively, at least one of positions between the power input terminal and the rectifier circuit, between the rectifier circuit and the intelligent power module, and between the intelligent power module and the power output terminal is connected with one first filter circuit.

Alternatively, the number of the first filter circuits is two, and a power supply line between the power input terminal and the rectifier circuit. A power supply line between the rectifier circuit and the intelligent power module are respectively connected with first ends of two first filter circuits in one-to-one correspondence. Or, the power supply line between the power input terminal and the rectifier circuit, and a power supply line between the intelligent power module and the power output terminal are respectively connected with the first ends of the two first filter circuits in one-to-one correspondence. Or, the power supply line between the rectifier circuit and the intelligent power module, and the power supply line between the intelligent power module and the power output terminal are respectively connected with the first ends of the two first filter circuits in one-to-one correspondence.

Alternatively, the number of the first filter circuits is three, and first ends of three first filter circuits are respectively connected between the power input terminal and the rectifier circuit, between the rectifier circuit and the intelligent power module, and between the intelligent power module and the power output terminal in one-to-one correspondence.

Alternatively, the power input terminal includes a neutral wire and a live wire. In response to the first end of the first filter circuit being connected between the power input terminal and the rectifier circuit, the first filter circuit includes a neutral wire filter unit and a live wire filter unit, and one end of the neutral wire filter unit and one end of the live wire filter unit are respectively connected with the neutral wire and the live wire in one-to-one correspondence, and the other end of the neutral wire filter unit and the other end of the live wire filter unit are connected with the metal plate. In response to the first end of the first filter circuit being connected between the rectifier circuit and the intelligent power module, the first filter circuit comprises a positive filter unit and a negative filter unit, one end of the positive filter unit and one end of the negative filter unit are respectively connected with the positive output end and the negative output end of the rectifier circuit in one-to-one correspondence and the other end of the positive filter unit and the other end of the negative filter unit are connected with the metal plate. In response to the first end of the first filter circuit being connected between the intelligent power module and the power output terminal, the first filter circuit comprises a three-phase filter unit, three ends of the three-phase filter unit are respectively connected with a three-phase power source terminal of the power output terminal in one-to-one correspondence, and the other three ends of the three-phase filter unit are connected with the metal plate.

Alternatively, the metal plate is connected with a ground wire of an AC power supply.

In the present disclosure, the electronic control assembly is provided with the electric control board by adding the metal plate on one side of the electric control board and setting a first filter circuit on the electric control board. The first end of the first filter circuit is electrically connected with the power supply line used to supply power to the electrical load through the wiring pattern on the electric control board. The second end of the first filter circuit is electrically connected with the metal plate. The metal plate is also electrically connected with the shell of the electrical load. Thus, a low impedance loop is formed between the first filter circuit, the metal plate and the shell of the electrical load. In response to the EMC interference signal being generated, the EMC interference signal will basically flow to the motor shell through the first filter circuit and the metal plate. The motor shell is connected with the motor winding, and there is the distributed capacitance between the metal plate and the electric control board. The EMC interference signal returns to the source of the EMC interference signal through the distributed capacitance, the motor shell and the motor winding, thus avoiding the EMC interference signal flowing out of the motor. At the same time, the EMC interference signal is gradually consumed in the form of heating in loop flow including the first filter circuit, the shell of the electrical load, the distributed capacitance and the rectifier circuit, and the intelligent power module, to avoid excessive EMC interference of the motor. The present disclosure can effectively block the transmission of the EMC interference signal from the power line, and realize the effective suppression of EMC from the source. The suppression effect of EMC is better to improve the overall performance of electrical device (including electrical appliances of motor). In addition, it can also help to reduce the difficulty of EMC rectification of complete electrical device and shorten the development cycle of complete electrical device.

BRIEF DESCRIPTION OF THE DRAWINGS

The embodiments of the present disclosure are described in the drawings used for the description of the embodiments will be briefly described. Apparently, the drawings described below are only for illustration, but not for limitation.

Figure 1:
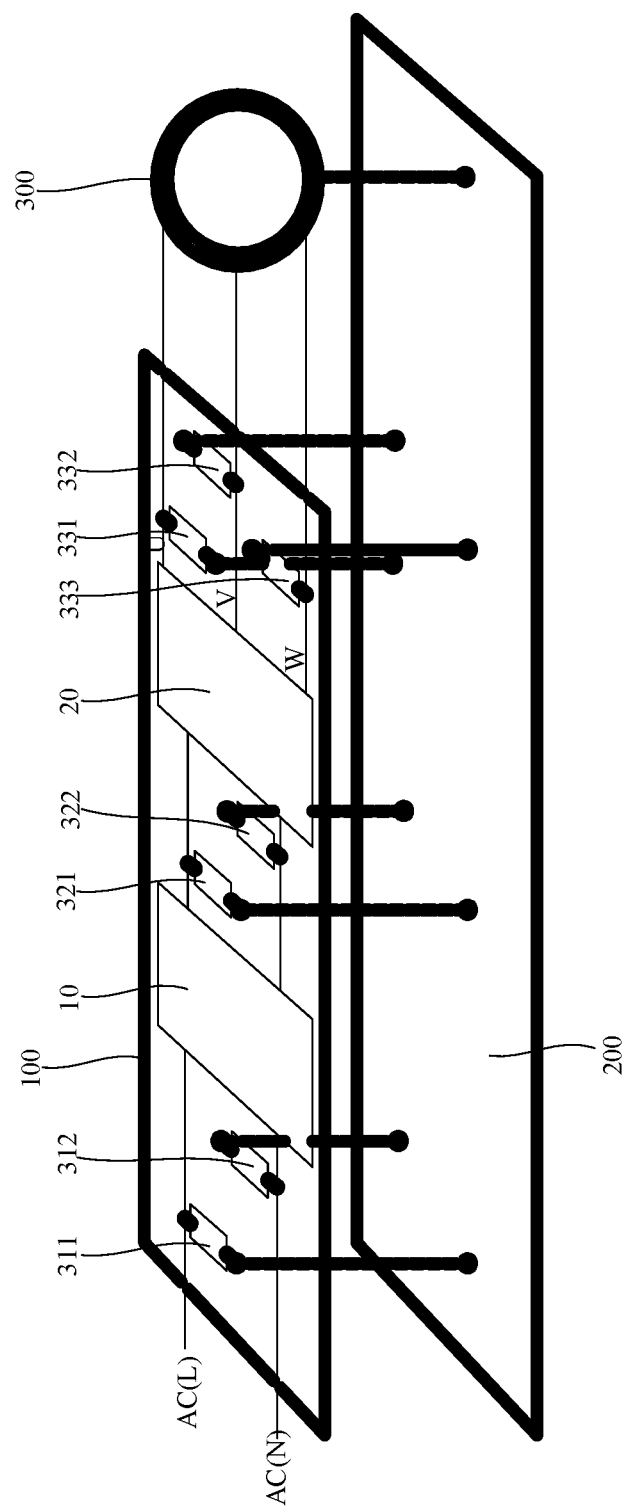
FIG. 1 is a schematic view of an electronic control assembly provided by an embodiment of the present disclosure.

The labels in the drawings are described as follows:

TABLE 1

| Reference numerals | Name |
| --- | --- |
| 100 | electric control board |
| 200 | metal plate |
| 300 | electrical load |
| 10 | rectifier circuit |
| 20 | intelligent power module |
| 30 | first filter circuit |
| 40 | second filter circuit |
| C1 | first capacitor |
| R1 | first resistor |
| L1 | first inductor |

DETAILED DESCRIPTION OF THE DISCLOSURE

The disclosure will now be described in detail with reference to the accompanying drawings and examples. Apparently, the described embodiments are only a part of the embodiments of the present disclosure, not all of the embodiments.

It should be noted that if the embodiments of the present disclosure involves directional indication (such as up, down, left, right, front, rear, etc.), the directional indications are only used to explain the relative position relationship and motion between the elements in a posture (as shown in the figure). If the specific posture changes, the directional indications will change accordingly.

In addition, if there are descriptions of "first", "second" and the like in the embodiments of the present disclosure, the descriptions of "first", "second" and the like are only used herein for purposes of description and are not intended to indicate or imply relative importance or implicitly indicating the number of indicated features. Thus, the features defined as "first" and "second" are intended to indicate or imply including one or more than one these features.

An electronic control assembly is provided by the present disclosure. The electronic control assembly is applied in electrical device. The electrical device can be air conditioner, washing machine or other household electrical device, especially for a multi-split air conditioner.

Figure 2:
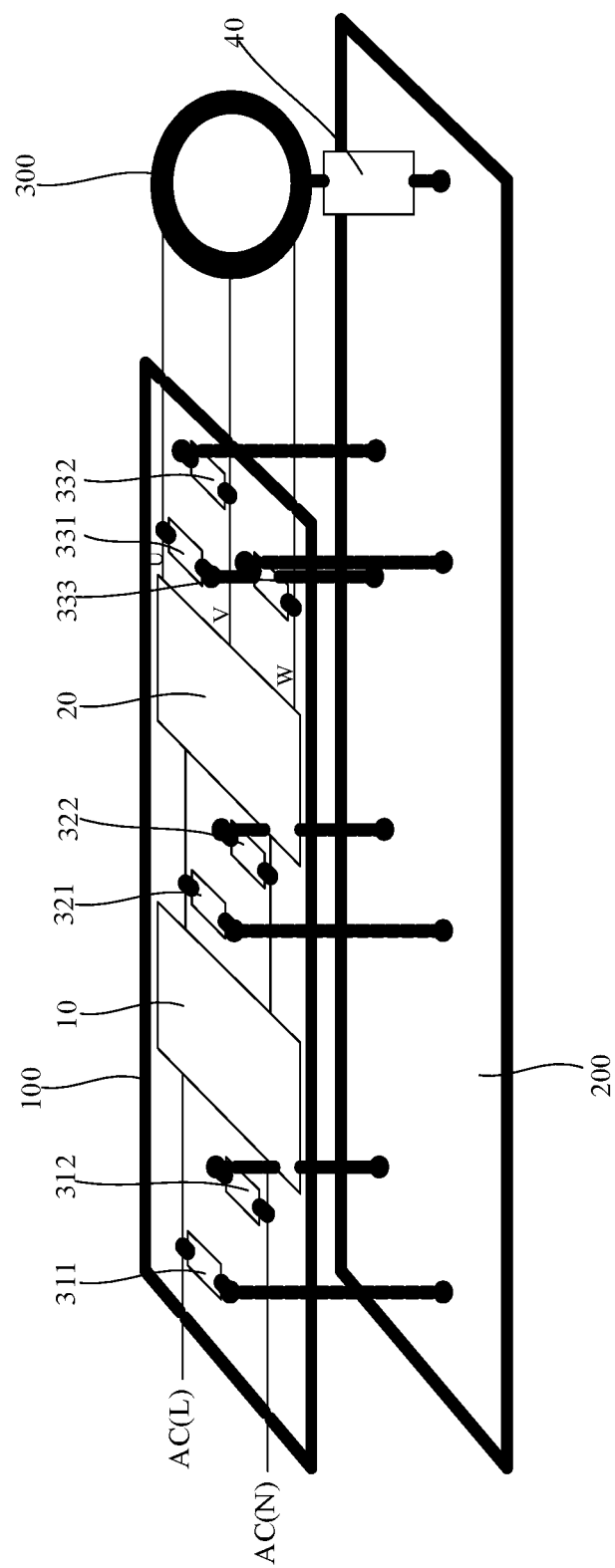
FIG. 2 is a schematic view of an electronic control assembly provided by another embodiment of the present disclosure.
Figure 3:
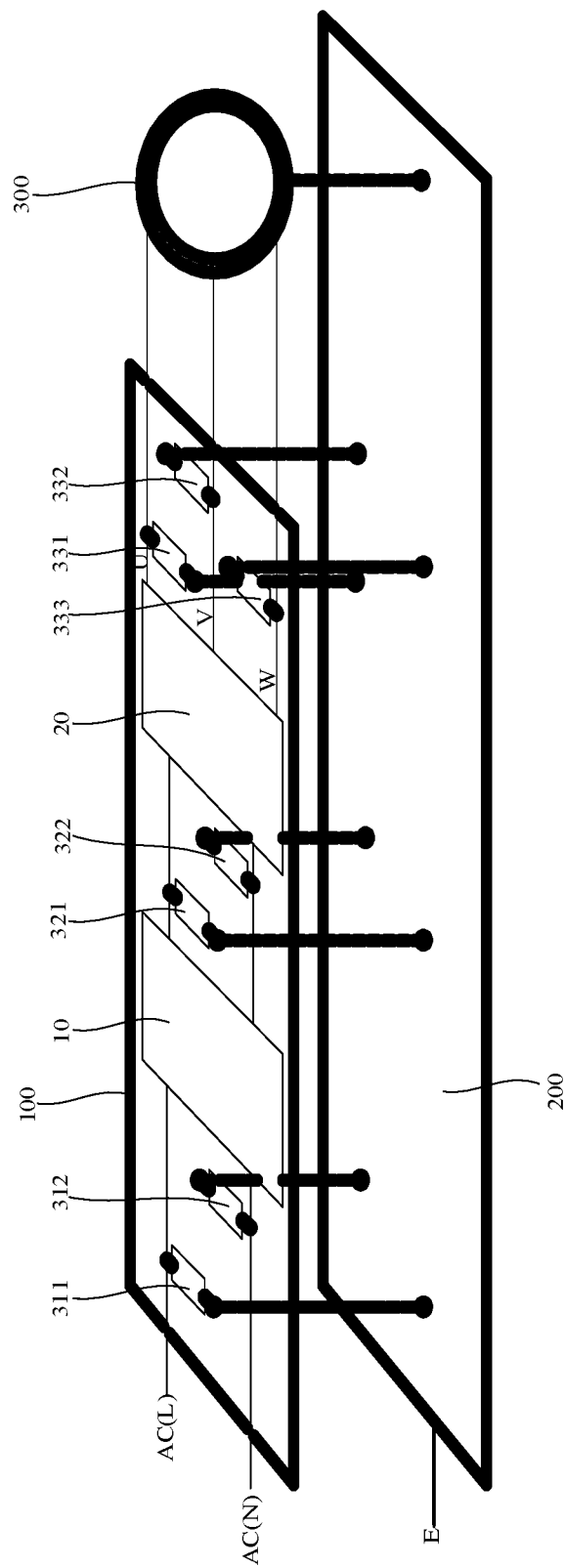
FIG. 3 is a schematic view of an electronic control assembly provided by another embodiment of the present disclosure.
Figure 4:
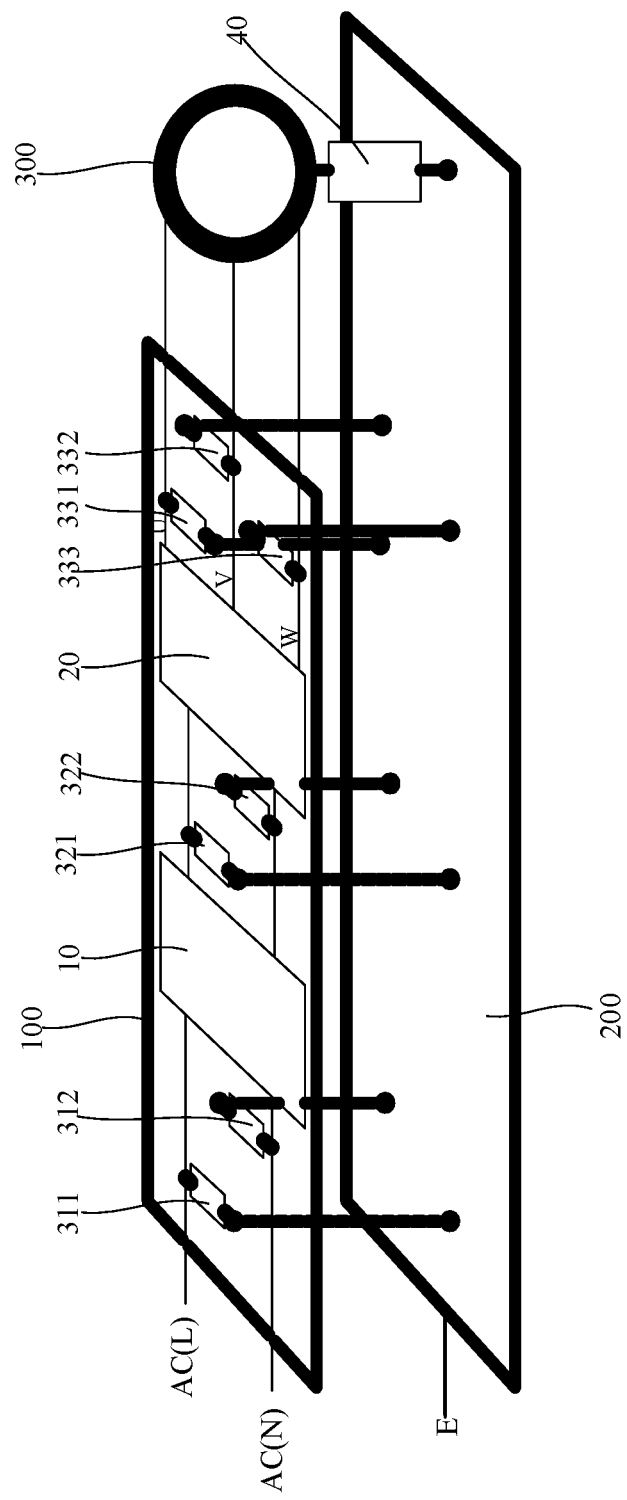
FIG. 4 is a schematic view of an electronic control assembly provided by another embodiment of the present disclosure.
Figure 5:
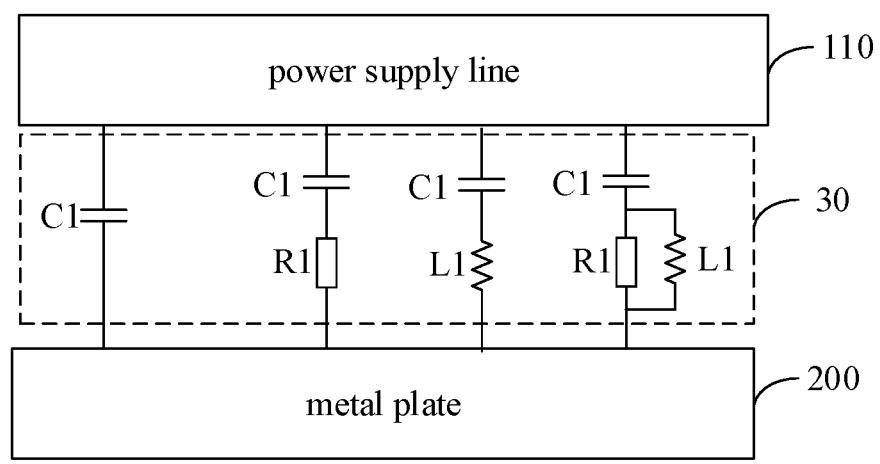
FIG. 5 is a schematic view of a circuit structure of a first filter circuit in the electronic control assembly provided by an embodiment of the present disclosure.
Figure 6:
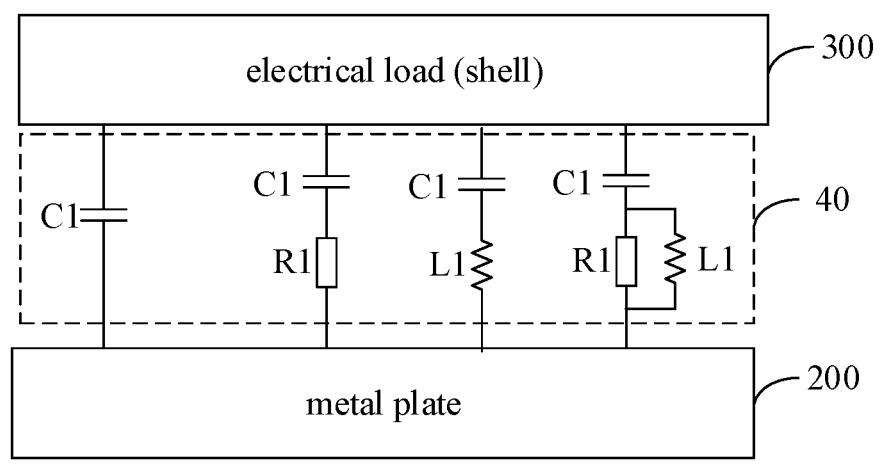
FIG. 6 is a schematic view of a circuit structure of a second filter circuit in the electronic control assembly provided by an embodiment of the present disclosure.

Referring to FIG. 1 to FIG. 6, in some embodiments of the present disclosure, the electronic control assembly may include an electric control board 100 and a metal plate 200.

The electric control board 100 is provided with a first filter circuit 30 and a power supply line (not labeled in the figures) for supplying power to an electrical load. The power supply line may include a power input terminal (AC (L) and AC (N)), a rectifier circuit 10, an intelligent power module 20 and a power output terminal (UVW). The power input terminal, the rectifier circuit 10, the intelligent power module 20 and the power output terminal (UVW) are successively connected with a load 300. A first end of the first filter circuit 30 is connected with the power supply line 110.

The metal plate 200 is arranged on one side of the electric control board 100 in parallel. The metal plate 200 and the electric control board 100 are arranged at intervals. The metal plate 200 is electrically connected with a shell of the electrical load 300. A second end of the first filter circuit 30 is electrically connected with the metal plate 200.

In the embodiment, the electric control board 100 can be realized by a single-sided panel or a double-sided board. The electric control board 100 can be set according to installation space and installation position of actual electrical device. The electric control board 100 can also be provided with a PFC circuit including PFC power switch, diode, PFC inductor and other components to realize power factor correction of the DC power output from the rectifier circuit 10. PFC circuit can be realized by passive PFC circuit to form boost PFC circuit, or buck PFC circuit, or boost and buck PFC circuit. It can be understood that in practical application, position and connection relationship between the PFC power switch 31 and the rectifier circuit 10 can be adaptively adjusted according to PFC circuit setting type.

The intelligent power module 20 integrates power switches. The plurality of power switches constitute a driving inverter circuit. For example, six power switches can constitute a three-phase inverter bridge circuit, or four power switches can constitute a two-phase inverter bridge circuit. The power switches can be realized by MOS or IGBT. The intelligent power module 20 is configured to drive a compressor motor. In other embodiments, the intelligent power module 20 can also be configured to drive other motor converters and various inverter power supplies. The intelligent power module 20 can be used in fields of variable frequency speed regulation, metallurgical machinery, electric traction, servo drive, air conditioning and other variable frequency household appliances.

The metal plate 200 can be made of copper metal and alloy thereof, and aluminum metal and alloy thereof. A distance between the metal plate 200 and the electric control board 100 can be set according to safety distance. Setting the distance between the metal plate 200 and the electric control board 100 within the safety distance can ensure that the metal plate 200 can better suppress an EMC interference signal. It can be understood that the metal plate 200 and the electric control board 100 can form distributed capacitance. The distance between the metal plate 200 and the electric control board 100 can be set according to the safety distance, and can also be set according to resonance frequency of formed distributed capacitance close to or equal to the EMC interference frequency of the motor. That is, the distance between the metal plate 200 and the electric control board 100 can make the resonance frequency of the formed distributed capacitance close or equal to the EMC interference frequency.

The electrical load 300 can be a compressor motor, a fan motor, or other electrical load 300 in the electrical device. For convenience of description, the following takes the motor as an example. The shell of the electrical load 300, that is, the motor shell, is generally a metal shell, and is connected with ground wire of the electrical device. Thus, the electrical device shell is also a ground protection wire.

The electrical device shell can connect all the electrical devices and metal pipelines into an equipotential network to form a loop metal network, thus achieving leakage protection and preventing electrostatic damage to electrical device.

In response to the electrical device starting to work, the rectifier circuit 10 converts AC power supply into DC voltage and outputs the DC voltage to the intelligent power module 20. The intelligent power module 20 inverts the DC voltage through a power transistor switch device set in the intelligent power module 20 according to an algorithm, to supply power for the electrical load 300. In working process of the rectifier circuit 10 and the intelligent power module 20, both the rectifier circuit 10 and the intelligent power module 20 will produce EMC interference signal, and AC power supply will also introduce part of EMC interference signal. For example, a power transistor in the intelligent power module 20 will produce high DV/dt and di/dt in the process of fast on/off, causing the EMC interference signal of electric control board 100.

In order to solve the above problems, the first end of the first filter circuit 30 is electrically connected with the power supply line 110 through a wiring pattern on the electric control board 100. The second end of the first filter circuit 30 is electrically connected with the metal plate 200, that is, the metal plate 200 and the electric control board 100 can be electrically connected with the first filter circuit 30 arranged on the electric control board 100 by means of wires, flexible circuit boards, etc. The metal plate 200 and the shell of the electrical load 300 are electrically connected by wires, flexible circuit boards, etc., and are fixedly connected by screws, riveting or welding, to form a low impedance conductor circuit between the metal plate 200 and the filter circuit and the shell of electrical device.

For example, in response to the EMC interference signal flowing from a positive side of the DC power supply of the rectifier circuit 10 to a negative side of the DC power supply, the EMC interference signal flows to the shell of the electrical device through the first filter circuit 30 and the metal plate 200. Since the distributed capacitance is formed between the metal plate 200 and the electric control board 100, and the motor shell is connected with ground wire of a motor winding, the EMC interference signal flowing to the motor shell will return to the rectifier circuit 10 through the distributed capacitance and the ground wire of the motor winding, and the intelligent power module 20. Thus, the EMC interference signal flowing out of the rectifier circuit 10 can be avoided.

In response to the EMC interference signal flowing from a power line of the three-phase inverter bridge circuit of the intelligent power module 20 to the motor, the EMC interference signal flows to the shell of the electrical device through the first filter circuit 30 and the metal plate 200. Since the distributed capacitance is formed between the metal plate 200 and a circuit wiring layer of the electric control board 100, and the motor shell is connected with the ground wire of the motor winding, the EMC interference signal flowing to the motor shell will return to the intelligent power module 20 through the distributed capacitance and the ground wire of the motor winding, to avoid the EMC interference signal flowing out of the intelligent power module 20. At the same time, the EMC interference signal is gradually consumed in the form of heating in loop flow including the first filter circuit 30, the metal plate 200, the motor shell, parasitic capacitance and a controller, to avoid excessive EMC interference of the motor.

In response to the EMC interference signal entering from the power line, a low impedance circuit formed by the EMC interference signal through the first filter circuit 30 and the metal plate 200 can also block the transmission of the EMC interference signal from the power line, that is, effective suppression of EMC from a source is realized, and the suppression effect of EMC is better to improve the overall performance of electrical device (including electrical appliances of motor) and improve matching degree between the motor and a motherboard. Thus, difficulty of EMC rectification of complete electrical device can be reduced and development cycle can be shortened.

In the present disclosure, the electronic control assembly is provided with the electric control board 100 by adding the metal plate 200 on one side of the electric control board 100. The first end of the first filter circuit 30 on the electric control board 100 is connected with the power supply line 110 through the wiring pattern on the electric control board 100. The second end of the first filter circuit 30 is electrically connected with the metal plate 200. The metal plate 200 is also electrically connected with the shell of the electrical load 300. Thus, a low impedance loop is formed between the first filter circuit 30, the metal plate 200 and the shell of the electrical load 300. In response to the EMC interference signal being generated, the EMC interference signal will basically flow to the motor shell through the first filter circuit 30 and the metal plate 200. The motor shell is connected with the motor winding, and there is the distributed capacitance between the metal plate 200 and the electric control board 100. The EMC interference signal returns to the source of the EMC interference signal through the distributed capacitance, the motor shell and the motor winding, thus avoiding the EMC interference signal flowing out of the motor. At the same time, the EMC interference signal is gradually consumed in the form of heating in loop flow including the first filter circuit 30, the shell of the electrical load 300, the distributed capacitance and the rectifier circuit 10, and the intelligent power module 20, to avoid excessive EMC interference of the motor. The present disclosure can effectively block the transmission of the EMC interference signal from the power line, and realize the effective suppression of EMC from the source. The suppression effect of EMC is better to improve the overall performance of electrical device products. In addition, it can also help to reduce the difficulty of EMC rectification of complete electrical device and shorten the development cycle of complete electrical device.

In addition, in the electronic control assembly of the present disclosure, it only needs to add the metal plate 200 on one side of the electronic control board 100. The filter circuit and the shell of the electrical load 300 are connected with the metal plate 200 to form the low impedance circuit, which can reduce use of the magnetic ring, reduce the EMC cost, and improve the production efficiency. Besides, the metal plate 200 occupies a very small space in the electric device. Thus, the metal plate 200 can also be applied to the electronic device with small built-in space. The installation space of electrical device can be further reduced, thus reducing volume of the electrical device.

Referring to FIG. 1 to FIG. 6, in an alternative embodiment, the first filter circuit 30 may be one or multiple, such as two or three, that is, at least one of positions between the power input terminal (AC (L) and AC (N)) and the rectifier circuit 10, between the rectifier circuit 10 and the intelligent power module 20, and between the intelligent power module 20 and the power output terminal is connected with one first filter circuit 30. In practical application, the number and position of the first filter circuit 30 can be set at the source of the EMC interference signal.

In response to the number of first filter circuits 30 being one, the first end of the first filter circuit 30 is connected between the power input terminal (AC (L) and AC (N)) and the rectifier circuit 10, or the first end of the first filter circuit 30 is connected between the rectifier circuit 10 and the intelligent power module 20, or the first end of the first filter circuit 30 is connected between the intelligent power module 20 and the electrical load 300.

In response to the number of first filter circuits 30 being two, a power supply line between the power input terminal (AC (L) and AC (N)) and the rectifier circuit 10, and a power supply line between the rectifier circuit 10 and the intelligent power module 20 are respectively connected with the first ends of two first filter circuits 30 in one-to-one correspondence.

Alternatively, the power supply lines between the power input terminal (AC (L) and AC (N)) and the rectifier circuit 10, and between the intelligent power module 20 and the power output terminal (UVW) are respectively connected with the first ends of the two first filter circuits 30 in one-to-one correspondence.

Alternatively, the power supply line between the rectifier circuit 10 and the intelligent power module 20, and the power supply line between the intelligent power module 20 and the power output terminal (UVW) are respectively connected with the first ends of the two first filter circuits 30 in one-to-one correspondence.

In response to the number of the first filter circuits 30 being three, the power supply line between the power input terminal (AC (L) and AC (N)), the power supply line between the rectifier circuit 10 and the intelligent power module 20, and the power supply lines between the intelligent power module 20 and the power output terminal (UVW) are respectively connected with the first ends of three first filter circuits 30 in one-to-one correspondence.

It can be understood that in response to the number of the first filter circuits 30 being multiple, the EMC interference signal generated by the AC power supply, the rectifier circuit 10 or the intelligent power module 20 can be coupled to the metal plate 200 through first filter circuits 30. Low impedance loops can be formed through the first filter circuit 30, the metal plate 200 and the shell of the electrical load 300. The plurality of low impedance loops can transmit the EMC interference signal generated by the rectifier circuit 10 and the intelligent power module 20 or the AC power supply back to the source of the EMC interference signal. Moreover, the plurality of first filter circuits 30 can make the EMC interference signal flow in the plurality of low impedance loops to improve a consumption speed of the EMC interference signal in the form of heating in the circuit flow including the first filter circuit 30, the shell of the electrical load 300, the distributed capacitance and the rectifier circuit 10, and the intelligent power module 20, thus further avoiding the excessive EMC interference of the motor.

Referring to FIG. 1 to FIG. 6, in an alternative embodiment, the power input terminal AC-in includes a neutral wire AC (N) and a live line AC (L). In response to the first end of the first filter circuit 30 being connected between the power input terminal AC-in and the rectifier circuit 10, the first filter circuit 30 includes a neutral wire filter unit 311 and a live line filter unit 312. One end of the neutral wire filter unit 311 and one end of the live line filter unit 312 are respectively connected with the neutral wire AC (n) and the live line AC (L) in one-to-one correspondence. The other end of the neutral wire filter unit 311 and the other end of the live line filter unit 312 are connected with the metal plate 200.

In response to the first end of the first filter circuit 30 being connected between the rectifier circuit 10 and the intelligent power module 20, the first filter circuit 30 includes a positive filter unit 321 and a negative filter unit 322. One end of the positive filter unit 321 and one end of the negative filter unit 322 are respectively connected with the positive output end D+ and the negative output end D− of the rectifier circuit 10 in one-to-one correspondence. The other end of the positive filtering unit 321 and the other end of the negative filtering unit 322 are connected with the metal plate 200.

In response to the first end of the first filter circuit 30 being connected between the intelligent power module 20 and the electrical load 300, the first filter circuit 30 includes a three-phase filter unit (331-333). Three ends of the three-phase filter unit (331-333) are respectively connected with a three-phase power source terminal (UVW) of the electrical load 300 in one-to-one correspondence. The other three ends of the three-phase filter unit (331-333) are connected with the metal plate 200.

In the embodiment, the plurality of filter units are respectively connected with power lines in one-to-one correspondence. Low impedance loops can be formed between the metal plate 200 and the motor shell by setting the plurality of filter units. Thus the EMC interference signal can be avoided flowing out of the motor. Loops are formed between the plurality of filter units and metal plate 200, motor shell, distributed capacitance formed by metal plate 200 and electric control board 100, the rectifier circuit 10 and the intelligent power module 20. Thus, the EMC interference signal is gradually consumed in the form of heating in the process of flowing in the plurality of loops. The suppression speed of EMC interference signal can be improved.

Referring to FIG. 1 to FIG. 6, in an alternative embodiment, the metal plate 200 is also connected with the ground wire E of the AC power supply.

In this embodiment, the metal plate 200 is also connected with the ground wire E of the AC power supply, thus forming low impedance loops in the first filter circuit 30, the ground wire E of the AC power supply and the shell of the electrical load 300. In response to the EMC interference signal being generated, the EMC interference signal will basically flow to the motor shell through the first filter circuit 30 and the metal plate 200, or to the ground wire E of the AC power supply through the first filter circuit 30 and the metal plate 200. The EMC interference signal will return to the generation source of the EMC interference signal through the distributed capacitance, the motor shell, the motor winding, and the ground wire E of the AC power supply, thus improving flow speed of EMC interference signal. At the same time, the EMC interference signal is gradually consumed in the form of heating in the loop flow including the first filter circuit 30, the shell of the electrical load 300, the distributed capacitance and the rectifier circuit 10, and the intelligent power module 20, thus avoiding the excessive EMC interference of the motor. Besides, the metal plate 200 is electrically connected with the ground wire E of the AC power supply, and potential is ground potential. The ground wire can be maintained through the metal plate 200, and the EMC interference signal can be suppressed to be transmitted to the ground wire.

Referring to FIG. 1 to FIG. 6, in an alternative embodiment, the electronic control assembly also includes an insulating component (not shown in the figures), and the insulating component is clamped between the electronic control board 100 and the metal plate 200.

In the embodiment, the insulating component can be a plastic sealing component for installing the electric control board 100, or the insulating component can also be a plate. The insulating component is clamped between the electric control board 100 and the metal plate 200 to realize insulation between the electric control board 100 and the metal plate 200. The insulating component, the electric control board 100 and the metal plate 200 can be fixed by screws. The insulating component and the metal plate 200 can also be connected by interference design (connection) or riveting, pressure casting, or can be integrated with the insulating component through some processing form, such as dispensing.

Referring to FIG. 1 to FIG. 6, in an alternative embodiment, the first filter circuit 30 may include a first capacitor C1. A first end of the first capacitor C1 is the first end of the first filter circuit 30. A second end of the first capacitor C1 is the second end of the first filter circuit 30.

Furthermore, the first filter circuit 30 may also include a first resistor R1 or a first inductor L1. The first resistor R1 or the first inductor L1 is arranged in series between the second end of the first capacitor C1 and the metal plate 200.

Furthermore, the first filter circuit 30 may also include a first resistor R1 or a first inductor L1. The first resistor R1 and the first inductor L1 are arranged in series between the second end of the first capacitor C1 and the metal plate 200.

Referring to FIG. 1 to FIG. 6, in an alternative embodiment, a second filter circuit 40 is also arranged in series between the metal plate 200 and the shell of the electrical load 300.

In the embodiment, the second filter circuit 40 is configured to form a low impedance circuit with the metal plate 200, the motor shell, the metal plate 200 and the first filter circuit 30. Thus, when there is an EMC interference signal, the EMC interference signal will basically flows to the motor shell through the first filter circuit 30, the metal plate 200, the second filter circuit 40. The motor shell is connected with the motor winding, and there is the distributed capacitance between the metal plate 200 and the electric control board 100. The EMC interference signal returns to the source of the EMC interference signal through the distributed capacitance, the motor shell and the motor winding, thus avoiding the EMC interference signal flowing out of the motor.

Furthermore, the second filter circuit 40 includes a first capacitor C1. The first end of the first capacitor C1 is the first end of the second filter circuit 40. The second end of the first capacitor C1 is connected with the metal plate 200.

Furthermore, the second filter circuit 40 also includes a first resistor R1 or a first inductor L1. The first resistor R1 or the first inductor L1 is arranged in series between the second end of the first capacitor C1 and the metal plate 200.

Furthermore, the second filter circuit 40 also comprises a first resistor R1 and a first inductor L1. The first resistor R1 and the first inductor L1 are arranged in series between the second end of the first capacitor C1 and the metal plate 200.

In the embodiment, both the first filter circuit 30 and the second filter circuit 40 can be realized by using the first capacitor C1, a RC filter circuit including the first capacitor C1 and the first resistor R1, a LC filter circuit including the first capacitor C1 and the first inductor L1, or a RLC filter circuit. In response to the RC filter circuit including the first capacitor C1 and the first resistor R1 being adopted, the first capacitor C1 and the first resistor R1 are successively arranged in series between the power supply line 110 and the metal plate 200. In response to the LC filter circuit including the first capacitor C1 and the first inductor L1 being adopted, the first capacitor C1 and the first inductor L1 are successively arranged in series between the power supply line 110 and the metal plate 200. In response to the RLC filter circuit including the first capacitor C1 and the first inductor L1 being adopted, the first inductor L1 and the first resistor R1 are connected in parallel and then set in series with the first capacitor C1, that is, the first capacitor C1 and the first inductor L1 and the first resistor R1 connected in parallel are set in series between the power supply line 110 and the metal plate 200. It can be understood that circuit structures of the first filter circuit 30 and the second filter circuit 40 can be the same or different, and there is no limitation here. Moreover, in the first filter circuit 30 and the second filter circuit 40, one or more filter branches may be set. For example, the first filter circuit 40 may be set as at least one of RC filter branch, LC filter branch and RLC filter branch.

The first capacitor C1 can be a Y capacitor with specification parameters corresponding to the EMC interference frequency. Thus the EMC interference signal can pass through the first capacitor C1 more easily. Alternatively, specification parameters of the first capacitor C1 corresponds to the EMC interference frequency of the motor, that is, resonance point frequency of the first capacitor C1 is close to or equal to the EMC interference frequency of the motor. The capacity of the first capacitor C1 determines the resonant point frequency of the first capacitor C1. The capacity of the first capacitor C1 can be set according to the EMC interference frequency, such as, 1000 pF, 2200 pF, 4700 pF, 10000 pF or other commonly used capacitors. The EMC interference signal flowing through the first resistor R1 can be gradually consumed in the form of heating through the first resistor R1, thus avoiding the excessive EMC interference of the motor. Band stop filter circuit can reduce impedance of the resonant signal by connecting the first capacitor C1 and the first inductor L1 in series. Thus, signals beyond resonant frequency can easily pass through, and the EMC interference frequency resonant signal can be effectively suppressed.

It can be understood that the filter circuit including the first capacitor C1, the first resistor or the first inductor L1 in the present disclosure does not need to be set the magnetic ring, the X capacitor or the common differential mode inductor, thus helping to reduce the EMC cost. Furthermore, the electronic control assembly does not need to be set the magnetic ring to make installation easy. Moreover, problems that sizes of EMC suppression devices such as magnetic ring, X capacitor or common differential mode inductor is too large to be applied in electrical device due to limitation of sizes of the above devices and internal structure of the motor can also be solved.

What is claimed is:

1. An electronic control assembly, comprising:
   an electric control board, comprising:
   a first filter circuit comprising at least one distributed capacitance; and
   a power supply line for supplying power to an electrical load, comprising a power input terminal, a rectifier circuit, an intelligent power module and a power output terminal, wherein the power input terminal, the rectifier circuit, the intelligent power module and the power output terminal are successively connected, and a first end of the first filter circuit is connected with the power supply line;
   and
   a metal plate arranged on one side of the electric control board in parallel, wherein the metal plate and the electric control board are arranged at intervals, the metal plate is electrically connected with a shell of the electrical load, and a second end of the first filter circuit is electrically connected with the metal plate such that a low impedance loop is formed between the first filter circuit, the metal plate, and the shell of the electrical load, wherein an Electro Magnetic Compatibility (EMC) interference signal generated by a source of the EMC interference signal, after reaching the shell of the electrical load, returns to the source of the ECM interference signal through the low impedance loop and is gradually consumed;

wherein the first filter circuit comprises a first capacitor, a first end of the first capacitor is the first end of the first filter circuit, and a second end of the first capacitor is connected with the metal plate;

wherein the first filter circuit further comprises a first resistor and a first inductor, and the first inductor and the first resistor are respectively arranged in series between the second end of the first capacitor and the metal plate.

2. The electronic control assembly according to claim 1, wherein at least one of positions between the power input terminal and the rectifier circuit, between the rectifier circuit and the intelligent power module, and between the intelligent power module and the power output terminal is connected with one first filter circuit.

3. The electronic control assembly according to claim 2, wherein the number of the first filter circuits is two, and a power supply line between the power input terminal and the rectifier circuit, and a power supply line between the rectifier circuit and the intelligent power module are respectively connected with first ends of two first filter circuits in one-to-one correspondence;

or, the power supply line between the power input terminal and the rectifier circuit, and a power supply line between the intelligent power module and the power output terminal are respectively connected with the first ends of the two first filter circuits in one-to-one correspondence;

or, the power supply line between the rectifier circuit and the intelligent power module, and the power supply line between the intelligent power module and the power output terminal are respectively connected with the first ends of the two first filter circuits in one-to-one correspondence.

4. The electronic control assembly according to claim 2, wherein the number of the first filter circuits is three, and first ends of three first filter circuits are respectively connected between the power input terminal and the rectifier circuit, between the rectifier circuit and the intelligent power module, and between the intelligent power module and the power output terminal in one-to-one correspondence.

5. The electronic control assembly according to claim 2, wherein the power input terminal comprises a neutral wire and a live wire; in response to the first end of the first filter circuit being connected between the power input terminal and the rectifier circuit, the first filter circuit comprises a neutral wire filter unit and a live wire filter unit, and one end of the neutral wire filter unit and one end of the live wire filter unit are respectively connected with the neutral wire and the live wire in one-to-one correspondence, and the other end of the neutral wire filter unit and the other end of the live wire filter unit are connected with the metal plate;

in response to the first end of the first filter circuit being connected between the rectifier circuit and the intelligent power module, the first filter circuit comprises a positive filter unit and a negative filter unit, one end of the positive filter unit and one end of the negative filter unit are respectively connected with the positive output end and the negative output end of the rectifier circuit in one-to-one correspondence and the other end of the positive filter unit and the other end of the negative filter unit are connected with the metal plate;

in response to the first end of the first filter circuit being connected between the intelligent power module and the power output terminal, the first filter circuit comprises a three-phase filter unit, three ends of the three-phase filter unit are respectively connected with a three-phase power source terminal of the power output terminal in one-to-one correspondence, and the other three ends of the three-phase filter unit are connected with the metal plate.

6. The electronic control assembly according to claim 1, wherein the metal plate is connected with a ground wire of an AC power supply.

7. The electronic control assembly according to claim 1, wherein the electronic control assembly further comprises an insulating component, and the insulating component is clamped between the electric control board and the metal plate.

8. The electronic control assembly according to claim 1, wherein a second filter circuit is arranged in series between the metal plate and the shell of the electrical load.

9. The electronic control assembly according to claim 8, wherein the second filter circuit comprises a first capacitor, a first end of the first capacitor is the first end of the second filter circuit, and a second end of the first capacitor is connected with the metal plate.

10. The electronic control assembly according to claim 9, wherein the second filter circuit further comprises a first resistor or a first inductor, and the first inductor or the first resistor is arranged in series between the second end of the first capacitor and the metal plate.

11. The electronic control assembly according to claim 9, wherein the second filter circuit further comprises a first resistor and a first inductor, and the first inductor and the first resistor are respectively arranged in series between the second end of the first capacitor and the metal plate.

12. An electrical device, comprising:
an electronic control assembly, comprising:
an electric control board, comprising:
a first filter circuit comprising at least one distributed capacitance; and
a power supply line for supplying power to an electrical load, comprising a power input terminal, a rectifier circuit, an intelligent power module and a power output terminal, wherein the power input terminal, the rectifier circuit, the intelligent power module and the power output terminal are successively connected, and a first end of the first filter circuit is connected with the power supply line;
and
a metal plate arranged on one side of the electric control board in parallel, wherein the metal plate and the electric control board are arranged at intervals, the metal plate is electrically connected with a shell of the electrical load, and a second end of the first filter circuit is electrically connected with the metal plate such that a low impedance loop is formed between the first filter circuit, the metal plate, and the shell of the electrical load, wherein an Electro Magnetic Compatibility (EMC) interference signal generated by a source of the EMC interference signal, after reaching the shell of the electrical load, returns to the source of the ECM interference signal through the low impedance loop and is gradually consumed;

wherein the first filter circuit comprises a first capacitor, a first end of the first capacitor is the first end of the first filter circuit, and a second end of the first capacitor is connected with the metal plate;

wherein the first filter circuit further comprises a first resistor and a first inductor, and the first inductor and the first resistor are respectively arranged in series between the second end of the first capacitor and the metal plate.

13. The electrical device according to claim 12, wherein at least one of positions between the power input terminal and the rectifier circuit, between the rectifier circuit and the intelligent power module, and between the intelligent power module and the power output terminal is connected with one first filter circuit.

14. The electrical device according to claim 13, wherein the number of the first filter circuits is two, and a power supply line between the power input terminal and the rectifier circuit, and a power supply line between the rectifier circuit and the intelligent power module are respectively connected with first ends of two first filter circuits in one-to-one correspondence;

or, the power supply line between the power input terminal and the rectifier circuit, and a power supply line between the intelligent power module and the power output terminal are respectively connected with the first ends of the two first filter circuits in one-to-one correspondence;

or, the power supply line between the rectifier circuit and the intelligent power module, and the power supply line between the intelligent power module and the power output terminal are respectively connected with the first ends of the two first filter circuits in one-to-one correspondence.

15. The electrical device according to claim 13, wherein the number of the first filter circuits is three, and first ends of three first filter circuits are respectively connected between the power input terminal and the rectifier circuit, between the rectifier circuit and the intelligent power module, and between the intelligent power module and the power output terminal in one-to-one correspondence.

16. The electrical device according to claim 13, wherein the power input terminal comprises a neutral wire and a live wire, in response to the first end of the first filter circuit being connected between the power input terminal and the rectifier circuit, the first filter circuit comprises a neutral wire filter unit and a live wire filter unit, and one end of the neutral wire filter unit and one end of the live wire filter unit are respectively connected with the neutral wire and the live wire in one-to-one correspondence, and the other end of the neutral wire filter unit and the other end of the live wire filter unit are connected with the metal plate;

in response to the first end of the first filter circuit being connected between the rectifier circuit and the intelligent power module, the first filter circuit comprises a positive filter unit and a negative filter unit, one end of the positive filter unit and one end of the negative filter unit are respectively connected with the positive output end and the negative output end of the rectifier circuit in one-to-one correspondence and the other end of the positive filter unit and the other end of the negative filter unit are connected with the metal plate;

in response to the first end of the first filter circuit being connected between the intelligent power module and the power output terminal, the first filter circuit comprises a three-phase filter unit, three ends of the three-phase filter unit are respectively connected with a three-phase power source terminal of the power output terminal in one-to-one correspondence, and the other three ends of the three-phase filter unit are connected with the metal plate.

17. The electrical device according to claim 12, wherein the metal plate is connected with a ground wire of an AC power supply.

* * * * *